United States Patent
Sawa et al.

[11] Patent Number: 6,030,724
[45] Date of Patent: *Feb. 29, 2000

[54] HYDROGEN-STORAGE ALLOY AND ALKALI SECONDARY BATTERY USING SAME

[75] Inventors: Takao Sawa; Takamichi Inaba, both of Yokohama; Yumiko Takahashi, Koshigaya, all of Japan

[73] Assignee: Kabushiki Kaisha Toshiba, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/666,393
[22] PCT Filed: Dec. 22, 1994
[86] PCT No.: PCT/JP94/02190
§ 371 Date: Aug. 2, 1996
§ 102(e) Date: Aug. 2, 1996
[87] PCT Pub. No.: WO95/17531
PCT Pub. Date: Jun. 29, 1995

[30] Foreign Application Priority Data

Dec. 22, 1993 [JP] Japan .................................. 5-324373

[51] Int. Cl.[7] .......................... H01M 40/38; H01M 4/46
[52] U.S. Cl. ....................................... 429/218.2; 420/900
[58] Field of Search ............................ 429/59, 101, 218, 429/218.2; 420/900

[56] References Cited

U.S. PATENT DOCUMENTS

| | | | |
|---|---|---|---|
| 4,339,255 | 7/1982 | Ovshinsky et al. | 65/32 |
| 4,623,597 | 11/1986 | Sapru et al. | |
| 4,983,474 | 1/1991 | Doi et al. | 429/59 |

(List continued on next page.)

FOREIGN PATENT DOCUMENTS

| | | |
|---|---|---|
| 0 342 654 A1 | 11/1989 | European Pat. Off. . |
| 4-80512 | 1/1984 | Japan . |
| 2-179836 | 7/1990 | Japan . |
| 2-194140 | 7/1990 | Japan . |
| 4-167365 | 6/1992 | Japan . |
| 5-320792 | 12/1993 | Japan . |

OTHER PUBLICATIONS

D. Shechtman et al., "Metallic Phase with Long-Range Orientational Order and No Translational Symmetry", Physical Review Letters, 53(20);1951–1953 (Nov. 1984).

Form PCT/ISA/210 for PCT/JP94/02190.

Yasuaki Osumi, "Hydrogen-Storage Alloy Properties and Appications", Agnetechnical Center, 1993.

(List continued on next page.)

Primary Examiner—Maria Nuzzolillo
Assistant Examiner—Carol Chaney
Attorney, Agent, or Firm—Finnegan, Henderson, Farabow, Garrett & Dunner, L.L.P.

[57] ABSTRACT

A hydrogen-storage alloy containing as a component element thereof an element easily reactive with hydrogen to be selected from among the elements of Group 1A, Group 1A, Group 3A, Group 4A, and Group 4A in the Periodic Table of the Elements and having a quasi-crystalline phase as at least part of the component phases thereof. The quasi-crystalline phase has an element of axial rotation selected from among 5-fold, 8-fold, 10-fold, and 12-fold symmetric axis. The hydrogen-storage alloy exhibits outstanding resistance to corrosion, permits effective prevention of comminution, and further excels in terms of the abundance of hydrogen to be absorbed and released. An alkali secondary battery is composed of an anode containing an element easily reactive with hydrogen as one of the component elements thereof and further incorporating therein a hydrogen-storage alloy possessing a quasi-crystalline phase as at least part of the component phases thereof, a cathode such as of the Ni type, for example, and a separator serving to separate the cathode and the anode. This alkali secondary battery can realize both elongation of service life and expansion of capacity.

26 Claims, 6 Drawing Sheets

U.S. PATENT DOCUMENTS

| | | | |
|---|---|---|---|
| 5,238,756 | 8/1993 | Fetchenko et al. | 429/59 |
| 5,268,143 | 12/1993 | Gamo et al. | 420/422 |
| 5,281,390 | 1/1994 | Gamo et al. | 420/422 |
| 5,407,761 | 4/1995 | Ovshinsky et al. | 429/59 |
| 5,470,404 | 11/1995 | Yamamoto et al. | 148/426 |
| 5,506,069 | 4/1996 | Ovshinsky et al. | 429/59 |
| 5,554,456 | 9/1996 | Ovshinsky et al. | 429/59 |

OTHER PUBLICATIONS

C. Suryanarayana et al., "Formation and Characteristics of Quasicrystalline Phases: A Review", International Journal of Rapid Solidification, vol. 3, 1987, pp. 253–293.

AN: 117–155656, Sakayori et al., "Hydrogen Diffusivity in Aluminum–Copper–Iron Quasicrystals", 1991, (no month).

D. Bahadur et al., "Studies of Hydrogen Diffusion in Metastable Ti–Ni–Fe–Si Alloys", Journal of Non–Crystalline Solids, vol. 109, 1989, pp. 54–58 (no month).

K.F. Kelton, "Quasicrystals: Structure and Stability", International Materials Reviews, vol. 38, No. 3, 1993, pp. 105–137, (no month).

J.H. Harris et al., "Universal Features of Hydrogen Absorption in Amorphous Transition–Metal Alloys", Physical Review B, vol. 36, No. 11, Oct. 15, 1987, pp. 5784–5797.

R.M. Stroud et al., "Stable Ti–Based Quasicrystal Offers Prospect for Improved Hydrogen Storage", Applied Physics Letters, vol. 69, No. 20, Nov. 11, 1996, pp. 2998–3000.

6,030,724

HYDROGEN-STORAGE ALLOY AND ALKALI SECONDARY BATTERY USING SAME

TECHNICAL FIELD

This invention relates to a hydrogen-storage alloy and an alkali secondary battery using the alloy.

BACKGROUND ART

In recent years, hydrogen which, when burnt, is transformed into $H_2O$ has been attracting attention as a clean energy. When utilization of hydrogen for energy is contemplated, such factors as the method for storage of hydrogen and the method for transportation thereof claim an important consideration. Since ordinary cylinders require large volumes for containing hydrogen economically, it is necessary to adopt some other methods. A hydrogen-storage alloy that reacts with hydrogen and absorbs hydrogen in the form of a metal hydroxide and, when exposed to heat, releases the hydrogen has been arresting keen attention as potential means for storage and transportation of hydrogen. The hydrogen-storage alloy promises extensive utility. Besides the means for storage of hydrogen and the means for transportation thereof mentioned above, the feasibility of utilizing the hydrogen-storage alloy in a wide variety of applications such as in fuel sources for automobiles driven by hydrogen, materials for anodes in secondary batteries, devices for separation, recovery, and refinement of hydrogen, heat pumps, quenching and warming systems, refrigerating systems, heat storing devices, actuators, compressors, temperature sensors, and catalysts is being studied.

The advance of electronic devices in recent years has come to demand secondary batteries as power sources for these electronic devices to offer improved performance. Specifically, the batteries have been required to acquire an increased capacity and an elongated service life. As respects the former requirement, in the Ni—Cd secondary batteries which have been in popular use to date, for example, nonsintered Ni—Cd secondary batteries provided with nonsintered electrodes of a three-dimensional construction have been developed to take the place of the electrode substrates in the conventional sintered batteries. These nonsintered Ni—Cd secondary batteries, however, have not necessarily attained a conspicuous increase in capacity.

In recent years, such an alkali secondary battery as, for example, a Ni-hydride secondary battery which uses as an anode what has a hydrogen-storage alloy powder immobilized in a collector has been proposed and has come to attract attention. The anode using this hydrogen-storage alloy is capable of increasing the energy density per unit weight or unit volume as compared with cadmium (Cd), a material for the anode in the typical conventional alkali secondary battery. The Ni-hydride secondary battery, therefore, is characterized by permitting an increase in the capacity of a secondary battery and having only a sparing possibility of environmental pollution as well.

As prospective materials for the construction of anodes in such secondary batteries as mentioned above, such crystalline hydrogen-storage alloys as alloys based on $LaNi_5$ having a $CaCu_5$ type crystal structure, alloys based on $ZrNi_2$ having a Laves structure, alloys of the TiFe type, and alloys of the $Mg_2Ni$ type have been mainly studied. A typical method for manufacturing an anode for an Ni-hydride secondary battery from such a hydrogen-storage alloy will be described above. First, the hydrogen-storage alloy is fused by means of high-frequency melting or arc melting and the melt is quenched and pulverized. The hydrogen-storage alloy powder thus obtained is kneaded with a conducting material and a binding agent and the resultant mix is applied or deposited fast on a collector. The anode using the hydrogen-storage alloy is consequently obtained.

The anode containing the hydrogen-storage alloy, when incorporated in a secondary battery, is fated to be immersed in a highly concentrated aqueous alkali solution serving as an electrolytic solution and also exposed to the oxygen emanating from an anode during the course of overcharge. The hydrogen-storage alloy of a crystalline texture, therefore, possibly has a serious problem of being deteriorated by corrosion. Further, since the hydrogen-storage alloy by nature undergoes voluminal expansion and contraction due to the entry therein and the release therefrom of hydrogen during the courses of charging and discharging, it has the problem of sustaining a crack and incurring progressive comminution of the hydrogen-storage alloy powder. Since the hydrogen-storage alloy consequently incurs an accelerated increase in the specific surface area thereof, the ratio of surface area deteriorated by the alkali electrolytic solution to the whole surface area of the hydrogen-storage alloy is inevitably increased to a great extent. Further, since the electroconductivity between the hydrogen-storage alloy powder and the collector is likewise deteriorated, the cycle life of the hydrogen-storage alloy is inevitably curtailed. Since the hydrogen-storage alloy of a crystalline texture which is manufactured through the aforementioned melting and pulverizing steps suffers occurrence of segregation in the texture of alloy during the course of such steps, it has the problem that the segregation is liable to induce dispersion in the electrode characteristics (particularly service life).

Therefore, it has been proposed to use amorphous hydrogen-storage alloys such as, for example, the amorphous hydrogen-storage alloys of the TiNi type and the MgNi type which are obtained by subjecting melts of corresponding alloys to rapidly quenching (U.S. Pat. No. 4,623,597 and JP-B-04-80,512). The feasibility of using amorphous hydrogen-storage alloys for the purpose of eliminating segregation, precluding the occurrence of dispersion of electrode characteristics and, at the same time, improving the resistance to corrosion, and preventing the comminution of alloy powder is being studied.

The conventional amorphous hydrogen-storage alloys mentioned above, however, have the grave disadvantage of being deficient in the plateau characteristic among the PCT (pressure composition thermostat) characteristics which have large effects on the characteristics of the alkali secondary battery. To be specific, they fail to obtain a plateau area of a small gradient and do not absorb and release hydrogen in a sufficiently large volume in the range of practical hydrogen pressure. As a result, they are no longer capable of attaining an increase in capacity as in an alkali secondary batter, for example. They further have such problems as necessitating a large number of cycles for the purpose of initial activation.

In addition to fulfilling the characteristics mentioned above, the hydrogen-storage alloy is generally required to absorb and release hydrogen at a high speed, incur only small hysteresis of the absorption and release of hydrogen, and enjoy light weight and low cost.

It is an object of this invention to provide a hydrogen-storage alloy which allows an increase in the volume of hydrogen to be absorbed and released in a practical range of hydrogen pressure and further facilitates the initial activation of the alloy besides realizing the improvement in the resistance to corrosion and the prevention of comminution of the alloy powder. Another object of this invention is to provide an alkali secondary battery which realizes both elongation of service life and enlargement of capacity in addition to securing practical serviceability.

DISCLOSURE OF THE INVENTION

The hydrogen-storage alloy of the present invention is a hydrogen-storage alloy that contains an element easily reactive with hydrogen as a component element thereof and is characterized by possessing a quasi-crystalline phase as at least part of the component phases thereof.

The alkali secondary battery of the present invention is characterized by comprising an anode which contains a hydrogen-storage alloy containing an element easily reactive with hydrogen as a component element thereof and possessing a quasi-crystalline phase as at least part of the component phases thereof and a cathode which is separated from the anode mentioned above by a separator containing an alkali electrolytic solution.

The hydrogen-storage alloy of this invention contains a quasi-crystalline phase as at least part of the component phases thereof. Unlike the ordinary crystalline phase which has 4-fold symmetry, this quasi-crystalline phase is endowed with such rotary symmetry as, for example, 5-fold, 8-fold, 10-fold, or 12-fold symmetry which is never allowed for the ordinary crystalline phase. Specifically, the quasi-crystalline phase has the structure of a phase of regular icosahedron, a phase of regular dodecagon, a phase of regular decagon, a phase of regular octagon, etc. The quasi-crystalline phase, on analysis by the X-ray diffraction, is found to be a phase containing an element of axial rotation normally incompatible with translational symmetry, namely a phase allowing the presence of a fifth, eighth, tenth, and twelfth axis of symmetry mentioned above. The presence of the quasi-crystalline phase can be confirmed by the X-ray diffraction or a transmission electron microscope.

The hydrogen-storage alloy which has the aforementioned quasi-crystalline phase can be obtained by methods of rapidly quenching a molten sample such as the single-roll method, twin-roll method, centrifugal spray method, REP method, RDP method, gas atomizing method, and water atomizing method, methods of solid-phase reaction such as the mechanical alloying method and mechanical grinding method, and methods of forming an alloy from a gaseous phase such as the spattering method. Depending on the composition of alloy, the manufacture can be realized at a quenching speed of the order of water quenching.

The ambience at the time of manufacture may be the open air. Since the hydrogen-storage alloy more often than not contains an active metal, however, it is advantageous to perform the manufacture thereof in a vacuum or in an ambience of such inert gas as Ar or He. When a metallic coolant is used for rapidly quenching, the material for the quenching is appropriately a Cu-based alloy, an Fe-based alloy, an Ni-based alloy, or such alloy plated with Cr. Particularly in the case of the centrifugal spray method, the medium used therefor is advantageously made of a material which exhibits poor wettability to the sample in a molten state. The crucible and the nozzle are appropriately made of such materials which exhibit low reactivity to the alloy in the molten state. Specifically, the materials which prove proper in this respect include alumina, zirconia, aluminum nitride, silicon nitride, silica, or such materials coated with BN. The orifice of the nozzle may be in the shape of a circular hole or a slit. The nozzle may contain only one orifice or two or more orifices.

This invention does not discriminate the hydrogen-storage alloy containing a quasi-crystalline phase and obtained by the method described above particularly on account of the form of alloy. The alloy may be effectively used in various forms such as thin strips, spheres, and particles resembling flakes. For the purpose of adjusting particle diameters of such discrete pieces of the alloy, mechanical pulverization by means of a jet mill or a jaw crusher may be employed. The alloy may be pulverized by causing it to absorb and release hydrogen. From the viewpoint of stabilizing the speed of hydrogen absorption and repressing possible deterioration of the characteristics of the alloy by the repetition of absorption and release of hydrogen, it is appropriate to set the average particle diameter of the hydrogen-storage alloy powder in the range from 0.1 to 100 $\mu$m. Preferably, the average particle diameter is in the range from 1 to 80 $\mu$m. The comminution and deterioration of the produced hydrogen-storage alloy by the absorption and release of hydrogen can be curbed by subjecting this alloy to a plating treatment such as Cu plating and Ni plating, a fluorinating treatment, a nitriding treatment, a carbonizing treatment, a boriding treatment, and an alkalinizing treatment.

The hydrogen-storage alloy containing a quasi-crystalline phase obtained by the method described above may be used in a rapidly quenched state or in a thermally treated state. When the heat treatment is carried out particularly under such conditions as lead to improvement of the quasi-crystallinity (exaltation of the intensity of the diffraction line peculiar to the quasi-crystalline phase), the plateau characteristic is improved further to a point where the heat-treated alloy advantageously functions especially as an active material for an electrode. A transition temperature ($T_1$) generally exists between a quasi-crystalline phase and an amorphous phase and a transition temperature ($T_2$) also exists between the quasi-crystalline phase and a crystalline phase. Preferably, therefore, the heat treat-ment is carried out at a temperature that exceeds $T_1$ and does not reach $T_2$. Specifically, the heat treatment is appropriately carried out at a temperature in the approximate range from 423 to 973 K for a period in the approximate range from one minute to 500 hours.

Advantageously in the hydrogen-storage alloy of this invention, the quasi-crystalline phase accounts for not less than 30% by volume of the component phases thereof. If the volume ratio of the quasi-crystalline phase is less than 30%, the effect due to the quasi-crystalline phase which will be specifically described herein below will not be fully obtained. The volume ratio of the quasi-crystalline phase is more preferably not less than 50%. Though the phase of the alloy other than the quasi-crystalline phase may be a crystalline phase or an amorphous phase. It is properly a crystalline phase when the alloy is utilized as an anodic material in a secondary battery. Metallo-graphically, the hydrogen-storage alloy is not limited to such factors as the cubic system. Particularly when it has a columnar structure, it enjoys the advantage that the deterioration of characteristics of the alloy by the repetition of absorption and release of hydrogen is extremely small.

For the hydrogen-storage alloy of this invention can be adopted the same alloy composition as the ordinary hydrogen-storage alloy which contains as component elements thereof such elements of Group 1, Group 2, Group 3, Group 4A, and Group 5 in the Periodic Table of the Elements as are easily reactive with hydrogen. As an example of the hydrogen-storage alloy of this invention, an alloy of a composition which is substantially represented by the general formula:

$$M_{100-x}M'_x \quad (1)$$

(wherein M is at least one element easily reactive with hydrogen to be selected from among Mg, Ca, Li, Ti, Zr, Hf, V, and Y, and the rare earth elements M' at least one element selected from among Ni, Fe, Co, Mn, Cr, Nb, Ta, Mo, W, Cu, Al, Si, Ag, Pd, Ga, Ge, Zn, Sn, In, Sb, B, C, N, O, and P, and x a numeral satisfying the expression, $30 \leq x \leq 70$ at %) may be cited. When such an element as Mg or Ti which is light and active is adopted particularly as the M element, the produced alloy permits a decrease in the weight of a secondary battery and allows production of a secondary storage battery appropriate as for the power source of a portable device. The alloy which is represented by the aforementioned formula (1) is enabled to acquire a quasi-crystalline phase as by controlling the ratio of the M element and the M' element thereof. If x is less than 30 at % or larger than 70 at %, the possibility of the alloy failing to acquire the quasi-crystalline phase will be great even when any of various methods of manufacture mentioned above and the heat treatment are adopted. The amount of hydrogen to be absorbed and released will be also decreased.

As concrete examples of the hydrogen-storage alloy of this invention, MgAlZn alloys (such as, for example, $Mg_{47.5}Al_{15.0}Zn_{37.5}$), MgAlAg alloys (such as, for example, $Mg_{50}Al_{40}Ag_{10}$), MgAlCu alloys (such as, for example, $Mg_{43.2}Al_{44.5}Cu_{12.3}$), MgAlGa alloys (such as, for example, $Mg_{39.5}Al_{40.0}Ga_{20.5}$), MgPdAgAl alloys, TiNiFeSi alloys (such as, for example, $Ti_{56}Ni_{18}Fe_{10}Si_{16}$), and MgREZn alloys (wherein RE represents rare earth elements including Y) (such as, for example, $Mg_{42}La_8Zn_{50}$) may be cited. These are not exclusive examples.

The hydrogen-storage alloy having the aforementioned quasi-crystalline phase as at least part of the component phases thereof is possessed of such PCT characteristics as exhibit a high plateau characteristic approximating that of a crystalline type hydrogen-storage alloy. Specifically, this plateau area in the PCT characteristics is relatively flat and apt to show a sharply rising trend. Further, the hydrogen dissociation pressure near room temperature is as low as less than 1 atm. The alloy also excels in terms of the abundance of hydrogen to be absorbed and released because it realizes the quasi-crystalline phase by virtue of a composition containing the element easily reactive with hydrogen (M element) which governs the reaction thereof with hydrogen in a relatively large amount as indicated by the aforementioned formula (1). The alkali secondary battery excelling in practical serviceability attains an addition to capacity as aimed at by utilizing as an anodic material therefor such a hydrogen-storage alloy as mentioned above.

Since the hydrogen-storage alloy which contains the quasi-crystalline phase as at least part of the component phases thereof metallographically approximates an amorphous alloy, it permits repression of the comminution of alloy attendant on the absorption and release of hydrogen, excels in the ability to resist the corrosion by an alkaline electrolytic solution, and facilitates initial activation of alloy. As described above, the hydrogen-storage alloy of this invention combines various properties that any hydrogen-storage alloy is demanded to exhibit.

The hydrogen-storage alloy of this invention is possessed of characteristic properties particularly fit for an anodic material in an alkaline secondary battery. Besides the anodic material for the alkali secondary battery, the hydrogen-storage alloy of this invention is useful in a wide variety of applications such as in devices for storage and transportation of hydrogen, devices for separation, recovery, and refinement of hydrogen, fuel sources for automobiles driven by hydrogen, heat pumps, quenching and warming systems, refrigerating systems, heat storing devices, actuators, compressors, temperature sensors, and catalysts.

The alkali secondary battery of this invention is composed of an anode incorporating therein the hydrogen-storage alloy of this invention containing the quasi-crystalline phase described above as at least part of the component phases thereof and a cathode separated from the anode by a separator. While the hydrogen-storage alloy to be used as an anodic material for an alkali secondary battery possesses such a construction and resorts to such a method of manufacture as described above, it properly contains the quasi-crystalline phase at a proportion of not less than 30% by volume of the component phases thereof. The proportion of the quasi-crystalline phase by volume is calculated based on the ratio of component phases in terms of diffraction intensity found in a specific peak obtained by the X-ray diffraction.

The material for composing the cathode may be selected so as to suit the kind of a secondary battery intended to utilize the cathode. For a Ni-hydride secondary battery, for example, such a material as nickel hydroxide is used. The separator for separating the cathode and the anode and the alkali electrolyte (liquid) to be used in the alkali secondary battery of this invention are the same as those which are used in the conventional alkali secondary battery.

The anode for use in the secondary battery utilizing the hydrogen-storage alloy of this invention is manufactured as follows. First, such an electroconductive powder as carbon black, graphite, or acetylene black is added in an amount in the approximate range from 0.1 to 4% by weight to a hydrogen-storage alloy powder. Further, a polyacrylate such as polysodium acrylate, a fluorine type resin such as polytetrafluoroethylene, and a binding agent such as carboxymethyl cellulose are added in a combined amount in the approximate range from 0.1 to 5% by weight to the hydrogen-storage alloy powder. The resultant mixture is kneaded and the produced mix is applied or deposited fast to a collector. Thus, the anode for the secondary battery is obtained.

The alkali secondary battery which utilizes the anode incorporating therein the hydrogen-storage alloy having the qausi-crystalline phase as at least part of the component phases thereof as described above, by virtue of the characteristic properties of the hydrogen-storage alloy used as a component material for the anode, acquires enhanced practical service-ability and, at the same time, realizes exaltation of capacity and elongation of service life as well. The exaltation of the capacity is based on the plateau characteristic of the hydrogen-storage alloy of this invention and the composition of alloy mentioned above. The elongation of service life is based on the fact that the hydrogen-storage alloy of this invention defies comminution and, at the same time, excels in resistance to corrosion.

MODE FOR CARRYING OUT THE INVENTION

Now, this invention will be described below with reference to working examples.

EXAMPLE 1 AND COMPARATIVE EXAMPLE 1

Figure 1:
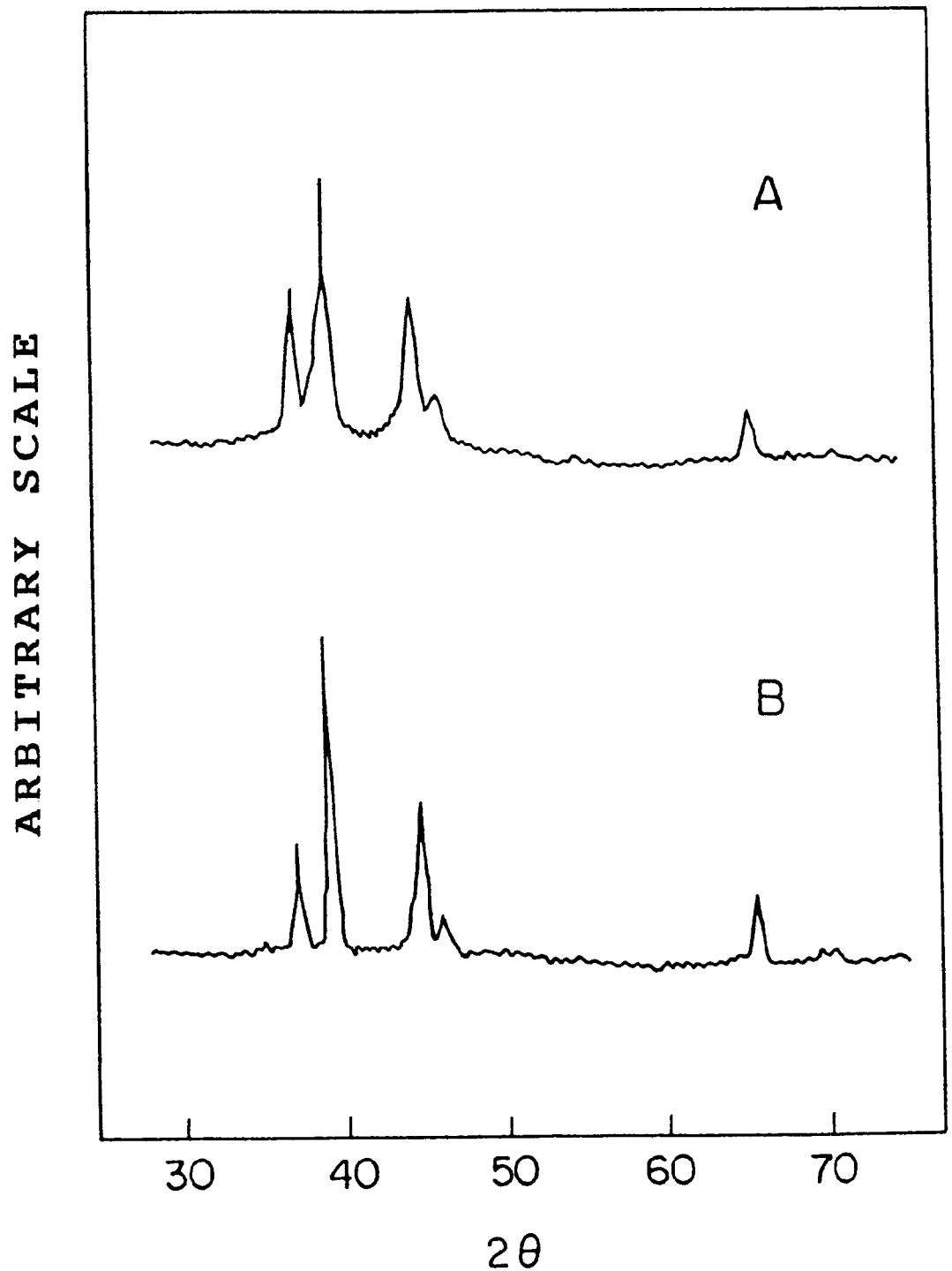
FIG. 1 is a diagram showing the X-ray diffraction pattern of a hydrogen-storage alloy as one embodiment of this invention, wherein A represents the X-ray diffraction pattern of the alloy in a rapidly quenched state and B the X-ray diffraction pattern of the alloy in a thermally treated state.

A sample in the form of flakes was obtained by melting an $Mg_{42}Ga_{20}Zn_{38}$ alloy and then superquenched by the single-roll method using a Cu roll as a quenching member and a nozzle made of zirconia in an ambience of Ar at a rate of 50 m/s. When this sample was subjected to an X-ray diffraction using a Cu—Kα ray, it produced a diffraction pattern shown in FIG. 1A. Based on this X-ray diffraction pattern, it was confirmed that this sample had a quasi-crystalline phase of the structure of regular icosahedron. The proportion of the quasi-crystalline phase by volume in the sample at this stage was about 80%. This sample was thermally treated under the conditions of 673 K×1 hour and then subjected to an X-ray diffraction. The X-ray diffraction pattern obtained is shown in FIG. 1B.

Figure 2:
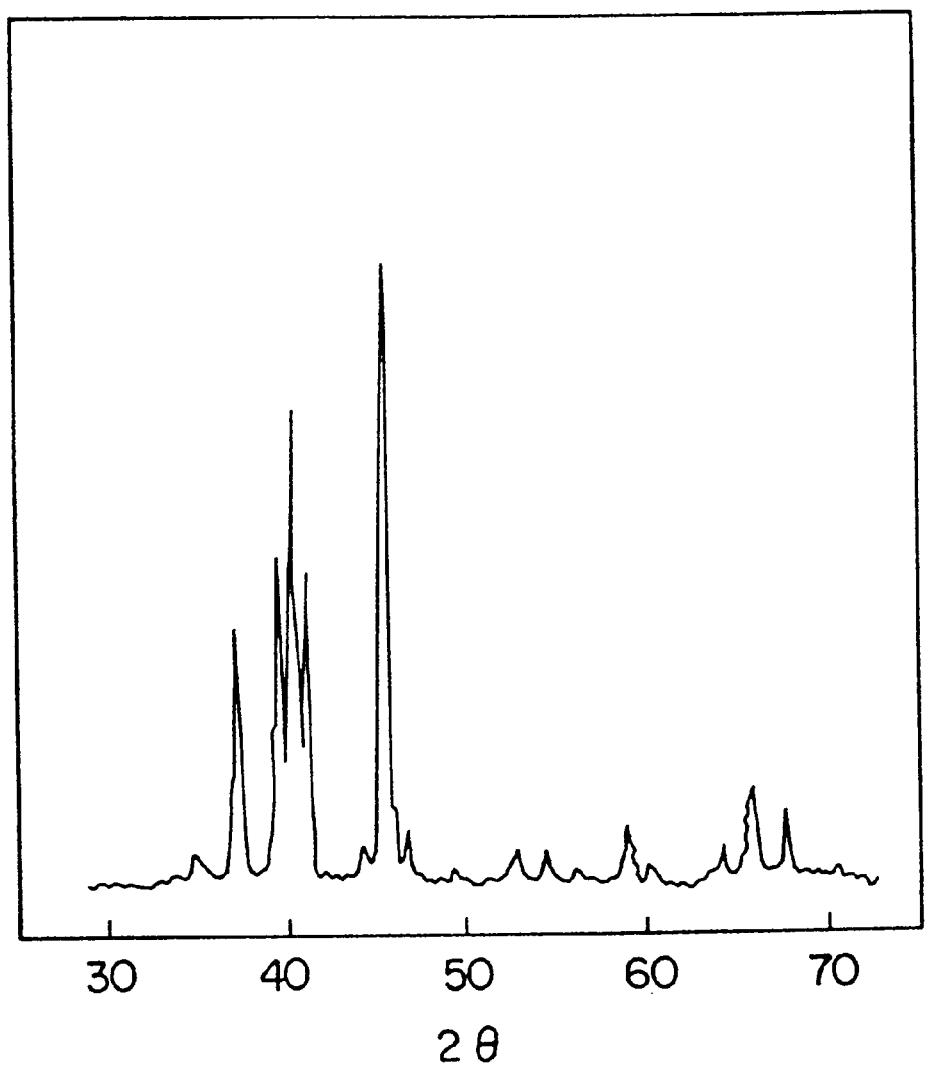
FIG. 2 is a diagram showing the X-ray diffraction pattern of a hydrogen-storage alloy employed for comparison with this invention.

For comparison with this invention, a sample in the form of flakes was manufactured by quenching an $Mg_{66.7}Ni_{33.3}$ alloy in the same manner as above. When this sample was subjected to the X-ray diffraction, an X-ray diffraction pattern shown in FIG. 2 was obtained. This pattern showed a diffraction line solely of an $Mg_2Ni$ phase, confirming the absence of a quasi-crystalline phase.

Figure 3:
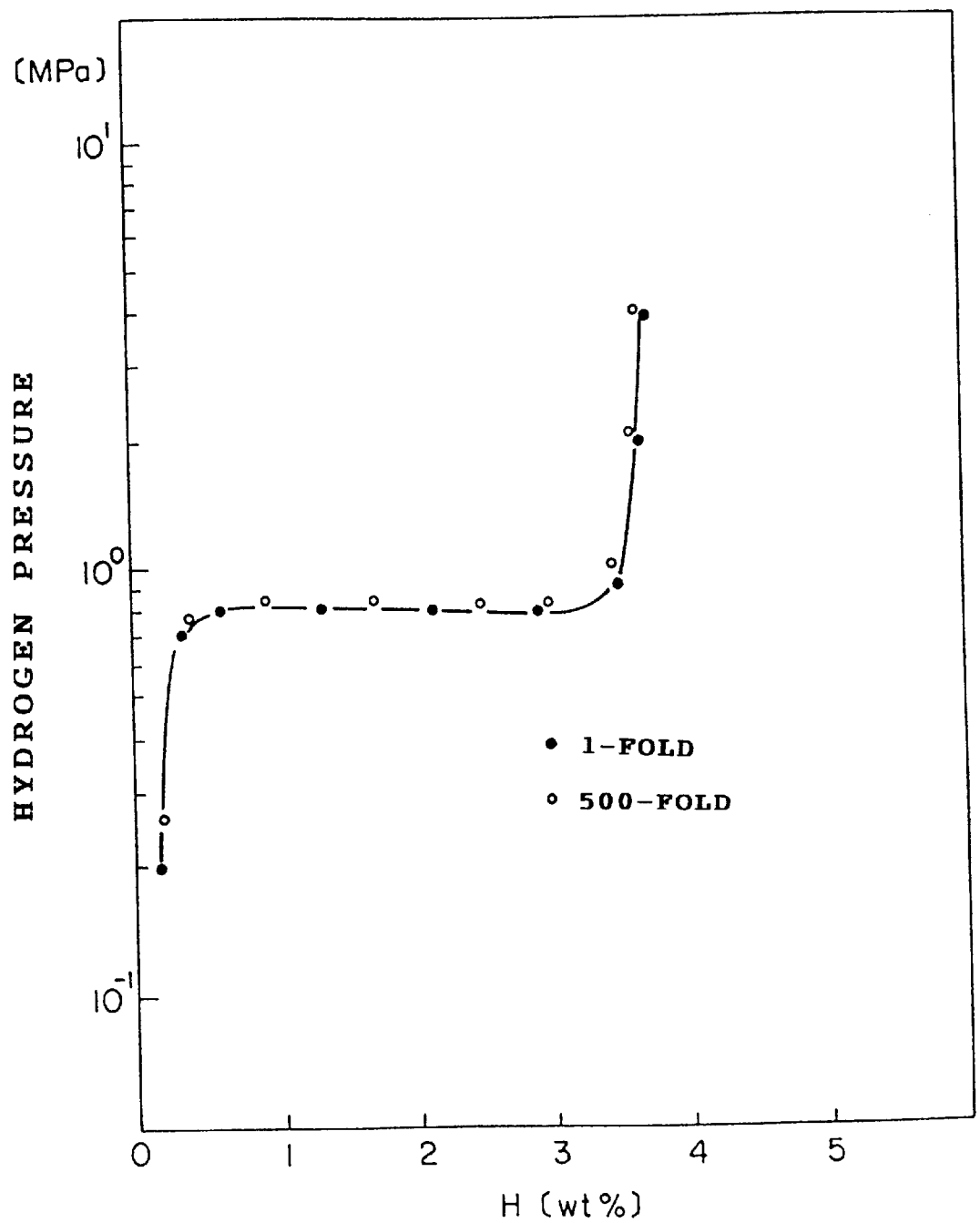
FIG. 3 is a diagram showing the characteristic properties exhibited by a hydrogen-storage alloy as one embodiment of this invention during the initial stage and after 500 cycles of absorption and release of hydrogen.

Then, the sample of Example 1 and that of Comparative Example 1 mentioned above were each thermally treated in an ambience of Ar at 673 K for 10 hours. In the hydrogen-storage alloy of Example 1 obtained in consequence of the thermal treatment, the proportion of the quasi-crystalline phase by volume was about 90% and a crystalline phase accounted for the balance. The samples subsequent to the thermal treatment were each rated for PCT characteristics at room temperature by the sievert method. The PCT characteristics represent the characteristics exhibited after one cycle of activation plus those exhibited after 500 cycles of absorption and release of hydrogen. FIG. 3 shows the characteristics of the hydrogen-storage alloy obtained in the example.

It is clearly noted from FIG. 3 that, in consequence of one round of activation, the hydrogen-storage alloy obtained in Example 1 began to effect easy absorption of hydrogen and to excel in terms of the abundance of hydrogen to be absorbed and released. It is further noted that the characteristics of the alloy were deteriorated only sparingly when the absorption and release of hydrogen was subsequently repeated. In contrast, the sample of Comparative Example 1 incurred difficulty in storage hydrogen up to about 573 K and it failed to absorb hydrogen at room temperature within the range of hydrogen pressure used in the experiment.

EXAMPLE 2 AND COMPARATIVE EXAMPLE 2

A sample of the form of flakes was obtained by melting a $Ti_{45}Ni_{28-y}Fe_ySi_{16}$ ($0 \leq y \leq 15$) alloy and then subjecting the melt to superquenching by the single-roll method. The sample was then pulverized by a jet mill to obtain samples for test. When these samples were subjected to an X-ray diffraction, diffraction patterns similar to that shown in FIG. 1 were obtained. Based on the diffraction patterns, it was confirmed that the samples each had a quasi-crystalline phase of the structure of regular icosahedron. The proportions of the quasi-crystalline phases in the samples were each about 90% by volume.

For comparison with this invention, a sample was prepared by quenching a $Ti_{60}Ni_{40}$ amorphous alloy in the same manner as above. When this sample was subjected to the X-ray diffraction, the X-ray diffraction pattern consequently obtained showed a diffraction line solely of an amorphous phase, confirming the absence of a quasi-crystalline phase.

Figure 4:
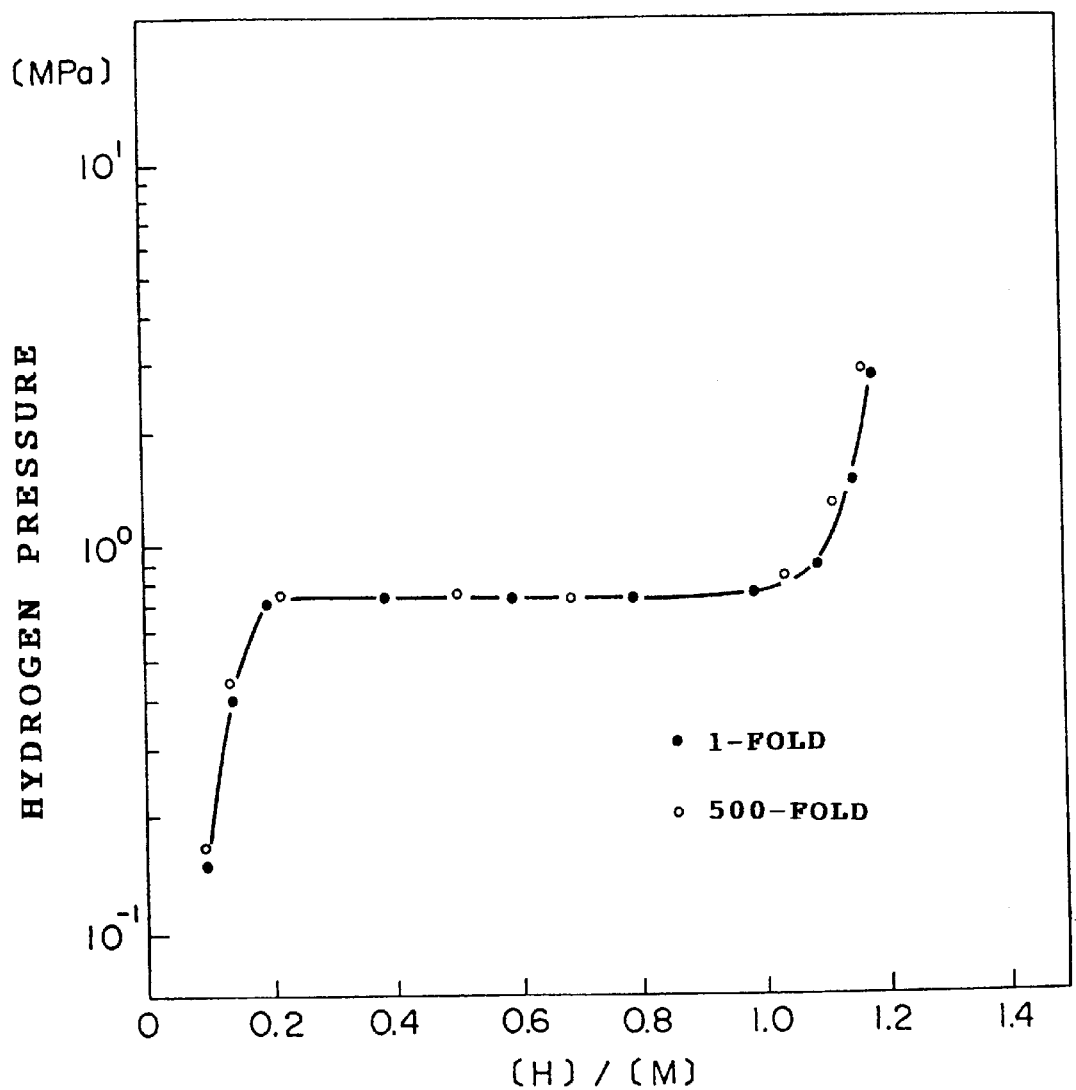
FIG. 4 is a diagram showing the characteristic properties exhibited by a hydrogen-storage alloy as another embodiment of this invention during the initial stage and after 500 cycles of absorption and release of hydrogen.
Figure 5:
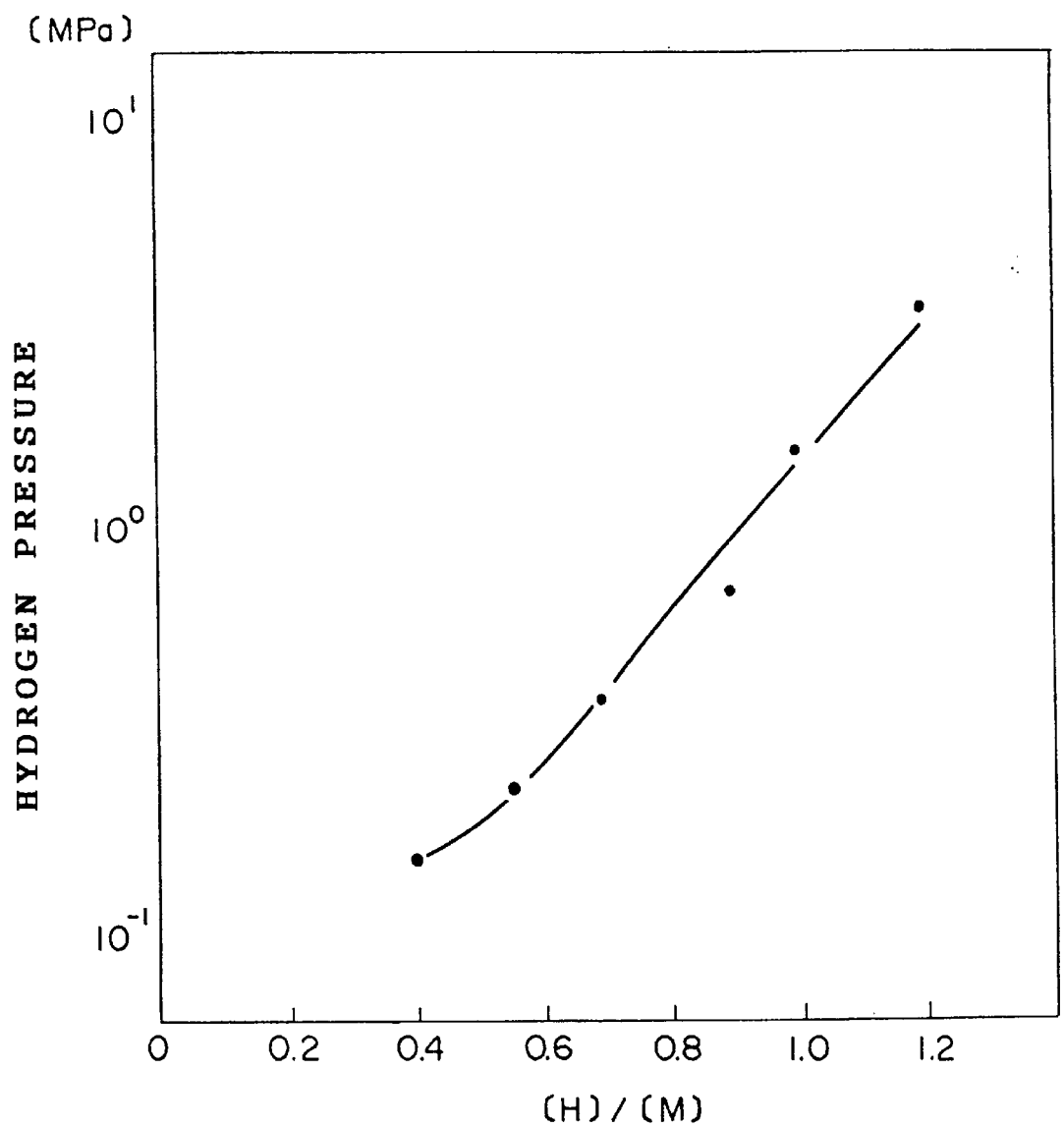
FIG. 5 is a diagram showing the characteristic properties exhibited by a hydrogen-storage alloy employed for comparison with this invention during the initial stage and after 500 cycles of absorption and release of hydrogen.

Then, the sample of Example 2 and that of Comparative Example 2 mentioned above were each rated for PCT characteristics in the same manner as in Example 1. The characteristics of the hydrogen-storage alloy of Example 2 are shown in FIG. 4 and those of the hydrogen-storage alloy of Comparative Example 2 in FIG. 5. It is clearly noted from FIG. 4 that, in consequence of one round of activation, the hydrogen-storage alloy of Example 2 began to effect easy absorption of hydrogen and incurred only sparing deterioration of characteristics when the absorption and release of hydrogen was repeated. It is further noted that the sample acquired a plateau characteristic of a small gradient and proved highly useful as for an anodic material in a secondary battery. It is noted from FIG. 5 that the hydrogen-storage alloy of Comparative Example 2 failed to acquire a flat plateau characteristic and proved practically defective as an anodic material in a secondary battery.

EXAMPLE 3 AND COMPARATIVE EXAMPLE 3

An $Mg_{47}Al_{15}Zn_{38}$ alloy was manufactured by a mechanical alloying method. To be specific, component raw materials were prepared in amounts calculated to satisfy a stated ratio of combination. In a pot made of stainless steel, the raw materials were placed together with balls similarly of stainless steel and pulverized and mixed therein under an ambience of Ar until an alloy was formed. When this sample was subjected to an X-ray diffraction. it produced a diffraction pattern similar to that of FIG. 1. Based on this diffraction pattern, it was confirmed that the sample had a quasi-crystalline phase of the structure of regular icosahedron. The proportion of the quasi-crystalline phase by volume in the sample was nearly 100%.

The hydrogen-storage alloy according to Example 3 and an $MmNi_{4.2}Al_{0.8}$ alloy (Mm: misch metal) manufactured for Comparative Example 3 were each used to manufacture an anode in an Ni-hydride secondary battery. Specifically, the hydrogen-storage alloy of Example 3 and the $MmNi_{4.2}Al_{0.8}$ alloy of Comparative Example 3 were each mechanically pulverized until an average particle diameter reached 10 μm. In a cutter mill, the alloy powder, Ketjen black as an electroconductive material, and polytetrafluoroethylene as a binding agent weighed out in amounts respectively accounting for 95.5% by weight, 0.5% by weight, and 4% by weight were stirred and mixed. The resultant mixtures were each scattered on a metallic net (collector) made of Ni and rolled with a roller press to manufacture an anode.

Separately, 90% by weight of nickel hydroxide and 10% by weight of cobalt monoxide were mixed. Then, 100 parts by weight of the resultant mixture and a small amount of carboxymethyl cellulose and 50 parts by weight of water were mixed by stirring to obtain a paste. A porous three-dimensional mass of nickel was packed with the paste, left drying, and then rolled with a roller press to manufacture Ni electrodes (cathodes). Ni-hydride secondary batteries constructed as shown in FIG. 6 were assembled by combining these cathodes with the anodes according to Example 3 and Comparative Example 3 and using an aqueous KOH solution as an electrolytic solution.

Figure 6:
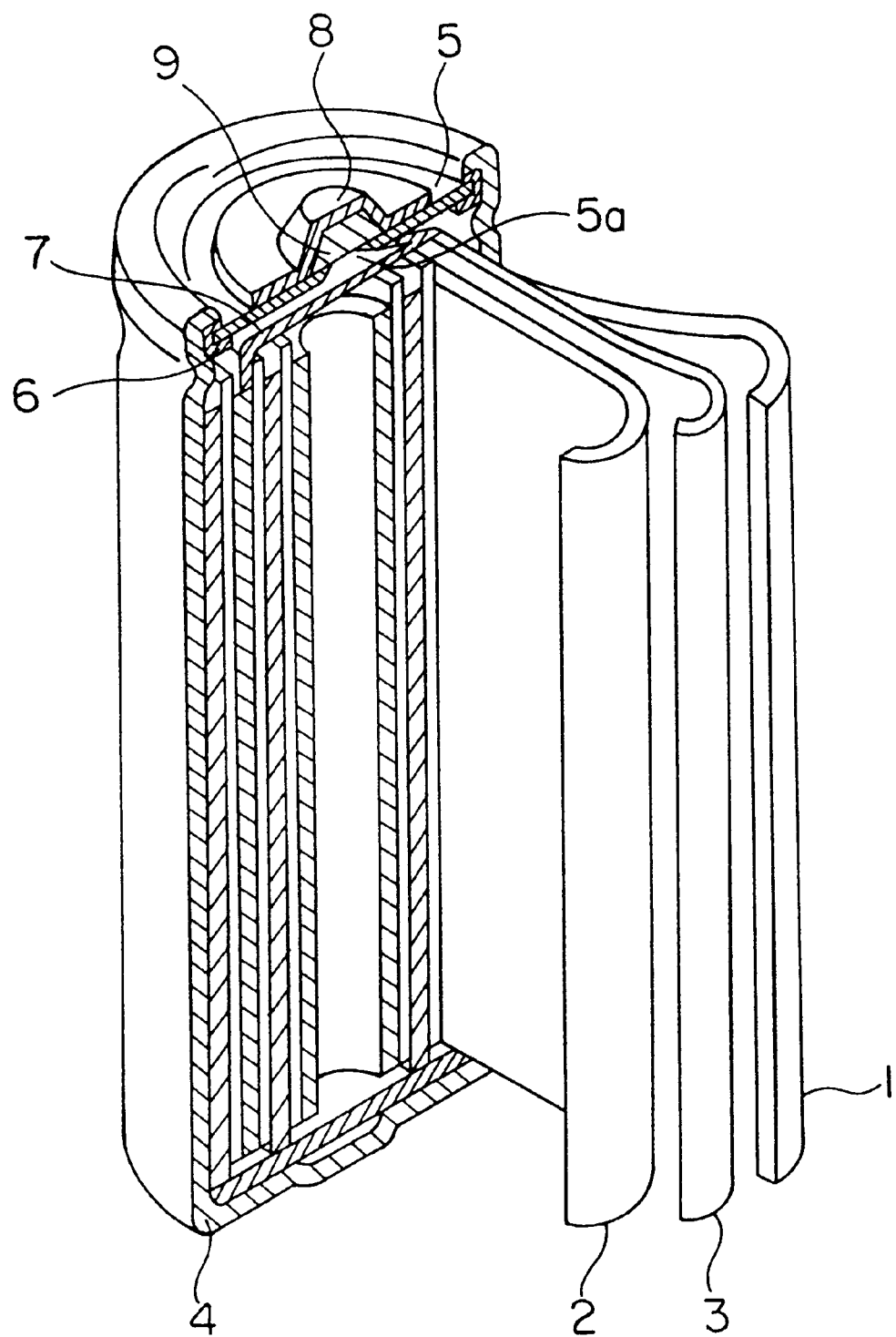
FIG. 6 is a perspective view showing a partially sectioned construction of an Ni-hydride secondary battery manufactured in one embodiment of the present invention.

In the N-hydride secondary battery shown in FIG. 6, an anode 1 containing a hydrogen-storage alloy, a nonsintered type Ni cathode 2, and a separator 3 interposed therebetween were rolled spirally and were accommodated in the rolled state in a cylindrical blind container 4 concurrently serving as a negative terminal. An alkali electrolytic solution was held inside the container 4, specifically in the separator 3. In the upper opening part of the container 4, a sealing plate 5 provided at the center thereof with a hole 5a is disposed. An annular insulating gasket 6 is disposed between the leading end part of the upper opening of the container 4 and the peripheral part of the sealing plate 5. The sealing plate 5 is airtightly fixed to the container 4 through the medium of the insulating gasket 6 by caulking the leading end part of the upper opening of the container 4 in the direction of decreasing diameter. A cathodic lead 7 has one end thereof connected to the Ni cathode 2 and the other end thereof connected to the lower side of the sealing plate 5. On the sealing plate 5, a cathodic terminal 8 of the shape of a cap is fitted so as to cover the hole 5a in the central part thereof. Inside an empty space enclosed with the sealing plate 5 and the cathodic terminal 8, a safety valve 9 made of rubber is disposed so as to plug the hole 5a in the sealing plate 5.

The Ni-hydride secondary batter constructed as described above was rated for charging and discharging characteristics. Specifically, the battery was completely discharged and then charged at 0.5 CmA. In each of the cycles of charging and discharging, the battery was tested for battery capacity. As a result, the Ni-hydride secondary battery according to Example 3 was found to have an initial value 320 mAh/g of discharge capacity and show a deterioration of 20% relative to the initial value after 820 cycles of charging and discharging. In contrast, the Ni-hydride secondary batter according to Comparative Example 3 was found to have an initial value 220 mAh/g of discharge capacity and show a deterioration of 20% relative to the initial value after 140 cycles of charging and discharging. It is noted from the test results that the Ni-hydride secondary battery using the hydrogen-storage alloy of this invention enjoyed improvement in electric capacity and service life.

EXAMPLE 4

A sample of the form of flakes was obtained by melting an $Mg_{42}Ce_8Zn_{50}$ alloy and then subjecting the resultant melt to superquenching by the single-roll method using a CuBe alloy roll. The quenching was carried out in an ambience of Ar and the roll was operated at a peripheral speed of 40 m/s. The flakes of the sample had thicknesses in the range from 40 to 60 $\mu$m. When this sample was subjected to an X-ray diffraction using a Cu—K$\alpha$ ray, it was concluded based on the diffraction pattern consequently obtained that the sample was formed substantially solely of a quasi-crystalline phase of the structure of regular icosahedron. Then, the sample was thermally treated in an ambience of Ar under the conditions of 873 K×2 hours and then left quenching.

The thermally treated sample was pulverized with a jet mill and classified to obtain a powder comprising particles of diameters range from 30 to 70 $\mu$m. This powder was used to manufacture an anode under the same conditions as used in Example 3 and assemble an Ni-hydride secondary battery constructed as shown in FIG. 6. The Ni-hydride secondary battery thus obtained was charged for one hour at 400 mA/g and then discharged in an equivalent electrode capacity to determine the length of a charging and discharging cycle. As a result, the sample was found to show a deterioration of 20% relative to the initial value of 360 mAh/g after 780 cycles of charging and discharging.

INDUSTRIAL APPLICABILITY

As described above, this invention can provide a hydrogen-storage alloy which allows an increase in the volume of hydrogen to be absorbed and released in a practical range of hydrogen pressure and further facilitates the initial activation of the alloy besides realizing the improvement in the resistance to corrosion and the prevention of comminution of the alloy powder. The hydrogen-storage alloy of this invention is useful such as in devices for storage and transportation of hydrogen, devices for separation, recovery, and refinement of hydrogen, fuel sources for automobiles driven by hydrogen, heat pumps, quenching and warming systems, refrigerating systems, heat storing devices, actuators, compressors, temperature sensors, and catalysts as well as in the anodic materials for the alkali secondary batteries. Specifically, the hydrogen-storage alloy described above can be utilized to manufacture an alkali secondary battery which excels in practical serviceability and further enjoys a high capacity and a long service life.

We claim:

1. A hydrogen-storage alloy material capable of absorbing and releasing hydrogen repeatedly, comprising:
    component phases comprised of component elements;
    wherein at least one component element reacts with hydrogen;
    wherein at least one component phase is a quasi-crystalline phase,
    and wherein said hydrogen-storage alloy comprises at least two phases prior to absorbing hydrogen.

2. The hydrogen-storage alloy material according to claim 1, wherein said component element which reacts with hydrogen is at least one element selected from the group consisting of Group 1 elements, Group 2 elements, Group 3 elements, Group 4 elements, and Group 5 elements in the Periodic Table of Elements.

3. The hydrogen-storage alloy material according to claim 1, wherein said quasi-crystalline phase has 5-fold, 8-fold, 10-fold, or 12-fold rotational symmetry.

4. The hydrogen-storage alloy material according to claim 1, wherein said quasi-crystalline phase has a regular icosahedron, regular dodecagon, regular decagon, or regular octagon structure.

5. The hydrogen-storage alloy material according to claim 1, wherein said quasi-crystalline phase accounts for at least 30% by volume of said component phases.

6. The hydrogen-storage alloy material according to claim 1, wherein said quasi-crystalline phase accounts for at least 50% by volume of said component phases.

7. A hydrogen-storage alloy material capable of absorbing and releasing hydrogen repeatedly comprising:
    a material with a composition according to the following chemical formula, $M_{100-x}M'_x$ (wherein M is at least one element which reacts with hydrogen selected from the group consisting of Mg, Ca, Li, Ti, Zr, Hf, V and the rare earth elements including Y, M' is at least one element selected from the group consisting of Ni, Fe, Co, Mn, Cr, Nb, Ta, Mo, W, Cu, Al, Si, Ag, Pd, Ga, Ge, Zn, Sn, In, Sb, B, C, N, O, and P, and x is a numeral satisfying the expression, $30 \leq x \leq 70$ at %);

wherein the material further comprises component phases;

wherein at least one component phases is quasi-crystalline, and wherein said hydrogen-storage alloy comprises at least two phases prior to absorbing hydrogen.

8. The hydrogen-storage alloy material according to claim 7, wherein said quasi-crystalline phase has 5-fold, 8-fold, 10-fold, or 12-fold rotational symmetry.

9. The hydrogen-storage alloy material according to claim 7, wherein said quasi-crystalline phase has a regular icosahedron, regular dodecagon, regular decagon, or regular octagon structure.

10. The hydrogen-storage alloy material according to claim 7, wherein said quasi-crystalline phase accounts for at least 30% by volume of said component phases.

11. The hydrogen-storage alloy material according to claim 7, wherein said quasi-crystalline phase accounts for at least 50% by volume of said component phases.

12. The hydrogen-storage alloy material according to claim 7, selected from the group consisting of MgAlZn alloys, MgAlAg alloys, MgAlCu alloys, MgAlGa alloys, MgPdAgAl alloys, TiNiFeSi alloys, and MgLaZn alloys.

13. An alkali secondary battery comprising:

component phases comprised of component elements; an anode comprising an element which reacts with hydrogen; a hydrogen-storage alloy material having a quasi-crystalline phase; and a cathode separated from said anode by a separator containing an alkali electrolyte, wherein said hydrogen-storage alloy comprises at least two phases prior to absorbing hydrogen.

14. The alkali secondary battery according to claim 13, wherein said element which reacts with hydrogen is at least one element selected from the group consisting of Group 1 elements, Group 2 elements, Group 3 elements, Group 4 elements, and Group 5 elements in the Periodic Table of Elements.

15. The alkali secondary battery according to claim 13, wherein said hydrogen-storage alloy material comprising a material with a composition according to the following chemical formula, $M_{100-x}M'_x$ (wherein M is at least one element which reacts with hydrogen selected from the group consisting of Mg, Ca, Li, Ti, Zr, Hf, V, Y, and the rare earth elements, M' is at least one element selected from the group consisting of Ni, Fe, Co, Mn, Cr, Nb, Ta, Mo, W, Cu, Al, Si, Ag, Pd, Ga, Ge, Zn, Sn, In, Sb, B, C, N, O, and P, and x is a numeral satisfying the expressing $30 \leq x \leq 70$ at %).

16. The alkali secondary battery according to claim 13, wherein said quasi-crystalline phase has 5-fold, 8-fold, 10-fold, or 12-fold rotational symmetry.

17. The alkali secondary battery according to claim 13, wherein said hydrogen-storage alloy material has a quasi-crystalline phase accounting for at least 30% by volume of said component phases.

18. The alkali secondary battery according to claim 13, wherein said anode comprises:

a collector; and said hydrogen-storage alloy material applied or deposited on said collector in addition to an electroconductive material and a binding agent.

19. The alkali secondary battery according to claim 13, which is an N-hydride secondary battery.

20. The hydrogen-storage alloy material according to claim 1, wherein said quasi-crystalline phase accounts for at least 50% by volume of said component phases.

21. The hydrogen-storage alloy material according to claim 1, wherein said quasi-crystalline phase accounts for at least 90% by volume of said component phases.

22. The hydrogen-storage alloy material according to claim 7, wherein said quasi-crystalline phase accounts for at least 50% by volume of said component phases.

23. The hydrogen-storage alloy material according to claim 7, wherein said quasi-crystalline phase accounts for at least 90% by volume of said component phases.

24. The alkali secondary battery according to claim 13, wherein said quasi-crystalline phase accounts for at least 50% by volume of said component phases.

25. The alkali secondary battery according to claim 13, wherein said quasi-crystalline phase accounts for at least 90% by volume of said component phases.

26. An hydrogen-driven automobile using a hydrogen-storage alloy material as a fuel source capable of absorbing and releasing hydrogen repeatedly, comprising:

component phases comprised of component elements;

wherein at least one component element reacts with hydrogen, wherein at least one component phase is a quasi-crystalline phase, and wherein said hydrogen-storage alloy comprises at least two phase prior to absorbing hydrogen.

* * * * *